(12) United States Patent
Zhan et al.

(10) Patent No.: US 11,327,365 B2
(45) Date of Patent: May 10, 2022

(54) APPARATUS AND METHOD FOR FABRICATING A DISPLAY SUBSTRATE OF LIQUID CRYSTAL DISPLAY PANEL

(71) Applicants: Hefei Xinsheng Optoelectronics Technology Co., Ltd., Anhui (CN); BOE Technology Group Co., Ltd., Beijing (CN)

(72) Inventors: Chengyong Zhan, Beijing (CN); Ting Wan, Beijing (CN); Jinliang Hu, Beijing (CN); Wenming Ren, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 614 days.

(21) Appl. No.: 16/330,540

(22) PCT Filed: Apr. 4, 2018

(86) PCT No.: PCT/CN2018/081890
§ 371 (c)(1),
(2) Date: Mar. 5, 2019

(87) PCT Pub. No.: WO2019/191933
PCT Pub. Date: Oct. 10, 2019

(65) Prior Publication Data
US 2021/0382356 A1 Dec. 9, 2021

(51) Int. Cl.
*G02F 1/1337* (2006.01)
*G02F 1/13* (2006.01)
*G02F 1/1335* (2006.01)

(52) U.S. Cl.
CPC ...... *G02F 1/133788* (2013.01); *G02F 1/1303* (2013.01); *G02F 1/133514* (2013.01)

(58) Field of Classification Search
CPC ............ G02F 1/133788; G02F 1/1303; G02F 1/133514
(Continued)

(56) References Cited

U.S. PATENT DOCUMENTS

2006/0280879 A1 12/2006 Park
2010/0225864 A1* 9/2010 Inoue ................ G02F 1/133788
349/123
(Continued)

FOREIGN PATENT DOCUMENTS

| CN | 104267542 A | | 1/2015 | |
|---|---|---|---|---|
| KR | 20170015799 A | | 2/2017 | |
| KR | 1020170015799 A | * | 2/2017 | ........... G02F 1/1337 |

OTHER PUBLICATIONS

International Search Report & Written Opinion dated Dec. 28, 2018, regarding PCT/CN2018/081890.

*Primary Examiner* — Charles S Chang
(74) *Attorney, Agent, or Firm* — Intellectual Valley Law, P.C.

(57) ABSTRACT

The present application provides an apparatus for fabricating a display substrate of a liquid crystal display panel. The apparatus includes a support for receiving a mother substrate having a plurality of display substrate units and a photoalignment material layer on the plurality of display substrate units; a plurality of polarizers including a first polarizer having a first light transmission axis, and a second polarizer having a second light transmission axis non-parallel to the first light transmission axis; and a light source for irradiating a light on a first display substrate unit of the plurality of display substrate units through the first polarizer and on a second display substrate unit of the plurality of display substrate units through the second polarizer.

16 Claims, 13 Drawing Sheets

(58) Field of Classification Search
USPC .......................................... 349/123, 158, 187
See application file for complete search history.

(56) References Cited

U.S. PATENT DOCUMENTS

| | | | |
|---|---|---|---|
| 2014/0227929 A1* | 8/2014 | Miyachi | G02F 1/133788 |
| | | | 445/24 |
| 2014/0313464 A1 | 10/2014 | Li et al. | |
| 2015/0226993 A1 | 8/2015 | Wu | |
| 2016/0246087 A1 | 8/2016 | Zhong et al. | |

* cited by examiner

APPARATUS AND METHOD FOR FABRICATING A DISPLAY SUBSTRATE OF LIQUID CRYSTAL DISPLAY PANEL

CROSS-REFERENCE TO RELATED APPLICATION

This application is a national stage application under 35 U.S.C. § 371 of International Application No. PCT/CN2018/081890, filed Apr. 4, 2018, the contents of which are incorporated by reference in the entirety.

TECHNICAL FIELD

The present invention relates to display technology, more particularly, to an apparatus and a method for fabricating a display substrate of a liquid crystal display panel.

BACKGROUND

A liquid crystal display device produces an image by applying an electric field to a liquid crystal layer between an array substrate and a counter substrate (e.g., a color filter substrate). The electric field changes an alignment direction of the liquid crystal molecules in a liquid crystal layer. Light transmittance of the liquid crystal layer is adjusted when the alignment direction of the liquid crystal molecules changes. The liquid crystal molecules in a liquid crystal display device are pre-aligned in an alignment direction. Typically, an alignment film is applied to one or both of an array substrate and a counter substrate. The alignment film is then aligned to achieve an alignment direction. For example, microgrooves for inducing liquid crystal molecules to align in a certain direction can be formed by rubbing a surface of the alignment film in a fixed direction. In another example, the alignment film includes a photoalignment material. The photoalignment material can be aligned by irradiation of a polarized ultraviolet light. In a photoalignment process, the photoalignment material absorbs the polarized ultraviolet light, undergoes a decomposition or an isomerization, thereby achieving optical anisotropy. The optical anisotropy can induce liquid crystal molecules to align along an alignment direction.

SUMMARY

In one aspect, the present invention provides an apparatus for fabricating a display substrate of a liquid crystal display panel, comprising a support for receiving a mother substrate comprising a plurality of display substrate units and a photoalignment material layer on the plurality of display substrate units; a plurality of polarizers comprising a first polarizer having a first light transmission axis, and a second polarizer having a second light transmission axis non-parallel to the first light transmission axis; and a light source for irradiating a light on a first display substrate unit of the plurality of display substrate units through the first polarizer and on a second display substrate unit of the plurality of display substrate units through the second polarizer.

Optionally, the apparatus further comprises a first conveyor configured to move the first polarizer from a first initial position to a first target position; and a second conveyor configured to move the second polarizer from a second initial position to a second target position.

Optionally, an orthographic projection of the first polarizer at the first target position on the mother substrate substantially covers the first display substrate unit and is substantially outside the second display substrate unit; and an orthographic projection of the second polarizer at the second target position on the mother substrate substantially covers the second display substrate unit and is substantially outside the first display substrate unit.

Optionally, the first polarizer comprises a plurality of first polarizer blocks; and the second polarizer comprises a plurality of second polarizer blocks.

Optionally, the plurality of first polarizer blocks at the first target position are in a plurality of levels having different heights relative to the support; multiple first polarizer blocks of the plurality of first polarizer blocks in each of the plurality of levels are spaced apart by a plurality of gaps; a first one of the plurality of first polarizer blocks at the first target position has a first orthographic projection on the support; the first orthographic projection partially overlaps with an orthographic projection on the support of one or more of the plurality of first polarizer blocks in different levels of the plurality of levels at the first target position; and a combined orthographic projection of the plurality of first polarizer blocks in the plurality of levels at the first target position on the support constitutes a continuous projection substantially without a gap.

Optionally, the plurality of second polarizer blocks at the second target position are in a plurality of levels having different heights relative to the support; multiple second polarizer blocks of the plurality of second polarizer blocks in each of the plurality of levels are spaced apart by a plurality of gaps; a first one of the plurality of second polarizer blocks at the second target position has a second orthographic projection on the support; the second orthographic projection partially overlaps with an orthographic projection on the support of one or more of the plurality of second polarizer blocks in different levels of the plurality of levels at the second target position; and a combined orthographic projection of the plurality of second polarizer blocks in the plurality of levels at the second target position on the support constitutes a continuous projection substantially without a gap.

Optionally, the apparatus further comprises a plurality of first conveying guide rails and a plurality of second conveying guide rails; the first conveyor is configured to move the plurality of first polarizer blocks from the first initial position to the first target position through the plurality of first conveying guide rails; and the second conveyor is configured to move the plurality of second polarizer blocks from the second initial position to the second target position through the plurality of second conveying guide rails.

Optionally, the plurality of first polarizer blocks respectively on the plurality of first conveying guide rails are in multiple levels having different heights relative to the support; and the plurality of second polarizer blocks respectively on the plurality of second conveying guide rails are in multiple levels having different heights relative to the support.

Optionally, the plurality of display substrate units comprise multiple ones of the first display substrate unit and multiple ones of the second display substrate unit; the first display substrate unit has a first size; the second display substrate unit has a second size different from the first size; an orthographic projection of the first polarizer at the first target position on the mother substrate substantially covers the multiple ones of the first display substrate unit; and an orthographic projection of the second polarizer at the second target position on the mother substrate substantially covers the multiple ones of the second display substrate unit.

Optionally, the apparatus further comprises a programmable logic controller configured to control the first conveyor and the second conveyor.

Optionally, the plurality of display substrate units are a plurality of array substrate units.

Optionally, the plurality of display substrate units are a plurality of color filter substrate units.

In another aspect, the present invention provides a method of fabricating a display substrate of a liquid crystal display panel, comprising providing a mother substrate comprising a plurality of display substrate units and a photoalignment material layer on the plurality of display substrate units on a support; substantially simultaneously disposing a first polarizer having a first light transmission axis and a second polarizer having a second light transmission axis non-parallel to the first light transmission axis on the mother substrate; and photo-aligning the photoalignment material layer by irradiating a light on a first display substrate unit of the plurality of display substrate units through the first polarizer and on a second display substrate unit of the plurality of display substrate units through the second polarizer.

Optionally, prior to photo-aliening the photoalignment material layer, the method further comprises moving the first polarizer from a first initial position to a first target position; and moving the second polarizer from a second initial position to a second target position.

Optionally, an orthographic projection of the first polarizer at the first target position on the mother substrate substantially covers the first display substrate unit and is substantially outside the second display substrate unit; and an orthographic projection of the second polarizer at the second target position on the mother substrate substantially covers the second display substrate unit and is substantially outside the first display substrate unit.

Optionally, the first polarizer comprises a plurality of first polarizer blocks in multiple levels having different heights relative to the support; wherein moving the first polarizer to the first target position comprises arranging the plurality of first polarizer blocks at the first target position so that multiple first polarizer blocks of the plurality of first polarizer blocks in each level are spaced apart by a plurality of gaps, a first one of the plurality of first polarizer blocks at the first target position has a first orthographic projection on the support, the first orthographic projection partially overlaps with an orthographic projection on the support of one or more of the plurality of first polarizer blocks in different levels at the first target position, and a combined orthographic projection of the plurality of first polarizer blocks in all levels at the first target position on the support constitutes a continuous projection substantially without a gap.

Optionally, the second polarizer comprises a plurality of second polarizer blocks in multiple levels having different heights relative to the support; wherein moving the second polarizer to the second target position comprises arranging the plurality of second polarizer blocks at the second target position so that multiple second polarizer blocks of the plurality of second polarizer blocks in each level are spaced apart by a plurality of gaps, a first one of the plurality of second polarizer blocks at the second target position has a second orthographic projection on the support, the second orthographic projection partially overlaps with an orthographic projection on the support of one or more of the plurality of second polarizer blocks in different levels at the second target position, and a combined orthographic projection of the plurality of second polarizer blocks in all levels at the second target position on the support constitutes a continuous projection substantially without a gap.

Optionally, the method further comprises moving the first polarizer to a third target position; and moving the second polarizer to a fourth target position.

Optionally, the plurality of display substrate units comprising multiple ones of the first display substrate unit and multiple ones of the second display substrate unit; the first display substrate unit has a first size; the second display substrate unit has a second size different from the first size; an orthographic projection of the first polarizer at the first target position on the mother substrate substantially covers the multiple ones of the first display substrate unit; and an orthographic projection of the second polarizer at the second target position on the mother substrate substantially covers the multiple ones of the second display substrate unit.

Optionally, the first polarizer comprises a plurality of first polarizer blocks in multiple levels having different heights relative to the support; and the second polarizer comprises a plurality of second polarizer blocks in multiple levels having different heights relative to the support; wherein the method further comprises determining numbers and target positions of the plurality of first polarizer blocks for photo-aligning the photoalignment material layer on the multiple ones of the first display substrate unit and numbers and target positions of the plurality of second polarizer blocks for photo-aligning the photoalignment material layer on the multiple ones of the second display substrate unit.

Optionally, the plurality of display substrate units are a plurality of array substrate units.

Optionally, the plurality of display substrate units are a plurality of color filter substrate units.

In another aspect, the present invention provides a display apparatus comprising a display substrate fabricated by the method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In a conventional fabrication process of a display substrate, multiple display substrate units of a same size are made on a single mother substrate, followed by cutting the mother substrate into multiple display substrates of a uniform size. The conventional fabrication process is the fastest way to make panels in the past, however, oftentimes not the most efficient way to produce panels. For example, on an 8.5-generation (G8.5) mother substrate, a maximum number of three 65-inch panels can be made, resulting in a 64% cutting efficiency and the remaining portion of the mother substrate being wasted.

Using a multi-model glass (MMG) technology, the cutting efficiency of the fabrication process can be dramatically enhanced. In a MMG process, multiple display substrate units of different sizes are made on a single mother substrate, followed by cutting the mother substrate into multiple display substrates of different sizes. For example, if the layout is planned correctly, it can be designed to have three 65-inch panels and six 32-inch panels together in a single G8.5 mother substrate (2200 mm×2500 mm). The cutting efficiency can be improved to over 90%.

Figure 1:
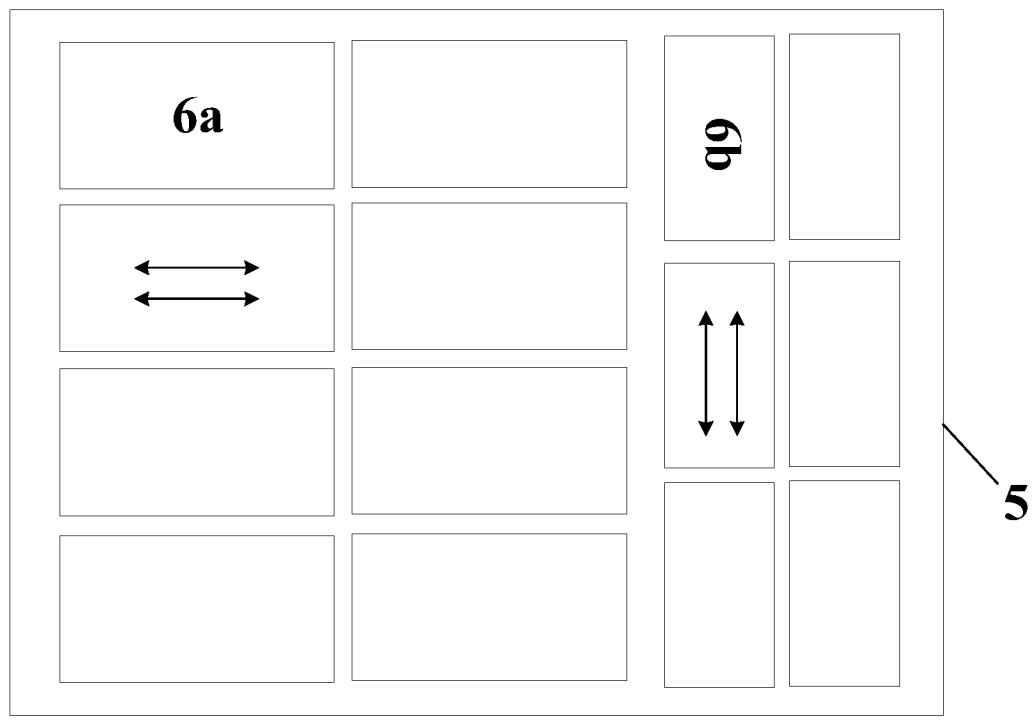
FIG. 1 is a schematic diagram illustrating the structure of a mother substrate having a plurality of display substrate units in some embodiments according to the present disclosure.
Figure 2:
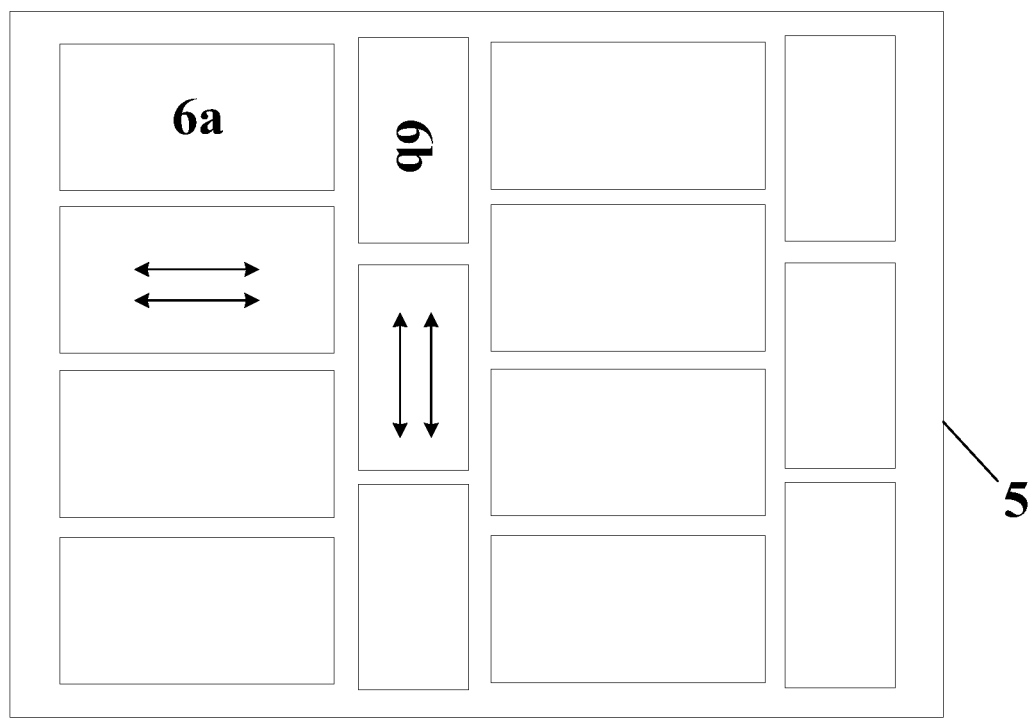
FIG. 2 is a schematic diagram illustrating the structure of a mother substrate having a plurality of display substrate units in some embodiments according to the present disclosure.

Display substrate units of different sizes, when fabricated on a single mother substrate, are arranged in different orientations. FIG. 1 is a schematic diagram illustrating the structure of a mother substrate having a plurality of display substrate units in some embodiments according to the present disclosure. Referring to FIG. 1, six of a first display substrate unit 6a and six of a second display substrate unit 6b are fabricated on a mother substrate 5. The display substrate units are arranged on the mother substrate 5 so that the length direction of the first display substrate unit 6a is along a horizontal direction, and the length direction of the second display substrate unit 6b is along a vertical direction. Accordingly, an intended alignment direction of an alignment film on the first display substrate unit 6a is different from an intended alignment direction of an alignment film on the second display substrate unit 6b. FIG. 2 is a schematic diagram illustrating the structure of a mother substrate having a plurality of display substrate units in some embodiments according to the present disclosure. In FIG. 2, columns of the second display substrate unit 6b are spaced apart by columns of first display substrate unit 6a, whereas in FIG. 1 the columns of the second display substrate unit 6b are adjacent to each other and the columns of first display substrate unit 6a are adjacent to each other.

Thus, to photo-aligning the photoalignment material layer on the display substrate units of different sizes on a single mother substrate, a multi-step alignment process is often required. First, a polarized ultraviolet light is irradiated on the first display substrate unit 6a to align the photoalignment material on the first display substrate unit 6a along a first alignment direction, while a first mask plate is used to block light from irradiating on the second display substrate unit 6b. Next, the mother substrate 5 is rotated 90 degrees, a second mask plate is used to block light from irradiating on the first display substrate unit 6a, and the polarized ultraviolet light is irradiated on the second display substrate unit 6b to align the photoalignment material on the second display substrate unit 6b along a second alignment direction. Although the cutting efficiency is improved in a MMG process, the tact time can be much longer as compared to the conventional process due to the different alignment directions of different display substrate units arranged on the single mother substrate. This results in a more complicated fabrication process and potentially higher manufacturing costs.

Accordingly, the present disclosure provides, inter alia, a novel apparatus and a method for fabricating a display substrate of a liquid crystal display panel that substantially obviate one or more of the problems due to limitations and disadvantages of the related art. Using the present apparatus and method, the photoalignment of display substrate units of different sizes can be performed in a single step, e.g., substantially simultaneously. In one aspect, the present disclosure provides an apparatus for fabricating a display substrate of a liquid crystal display panel. In some embodiments, the apparatus includes a support for receiving a mother substrate having a plurality of display substrate units and a photoalignment material layer on the plurality of display substrate units; a plurality of polarizers including a first polarizer having a first light transmission axis, and a second polarizer having a second light transmission axis non-parallel to the first light transmission axis; and a light source for irradiating a light on a first display substrate unit of the plurality of display substrate units through the first polarizer and on a second display substrate unit of the plurality of display substrate units through the second polarizer. Using the present apparatus, the photoalignment material layer on the first display substrate unit 6a and the second display substrate unit 6b can be aligned in a single step, obviating the need of multi-step photoalignment process involving multiple mask plates. By having a plurality of polarizers, a plurality of polarized light corresponding to the plurality of display substrate units can be generated in a single step process. The present apparatus and method not only achieve excellent cutting efficiency in the MMG process, but also significantly simplify the fabrication process and reduce the tact time and manufacturing costs associated with the MMG process.

Figure 3:
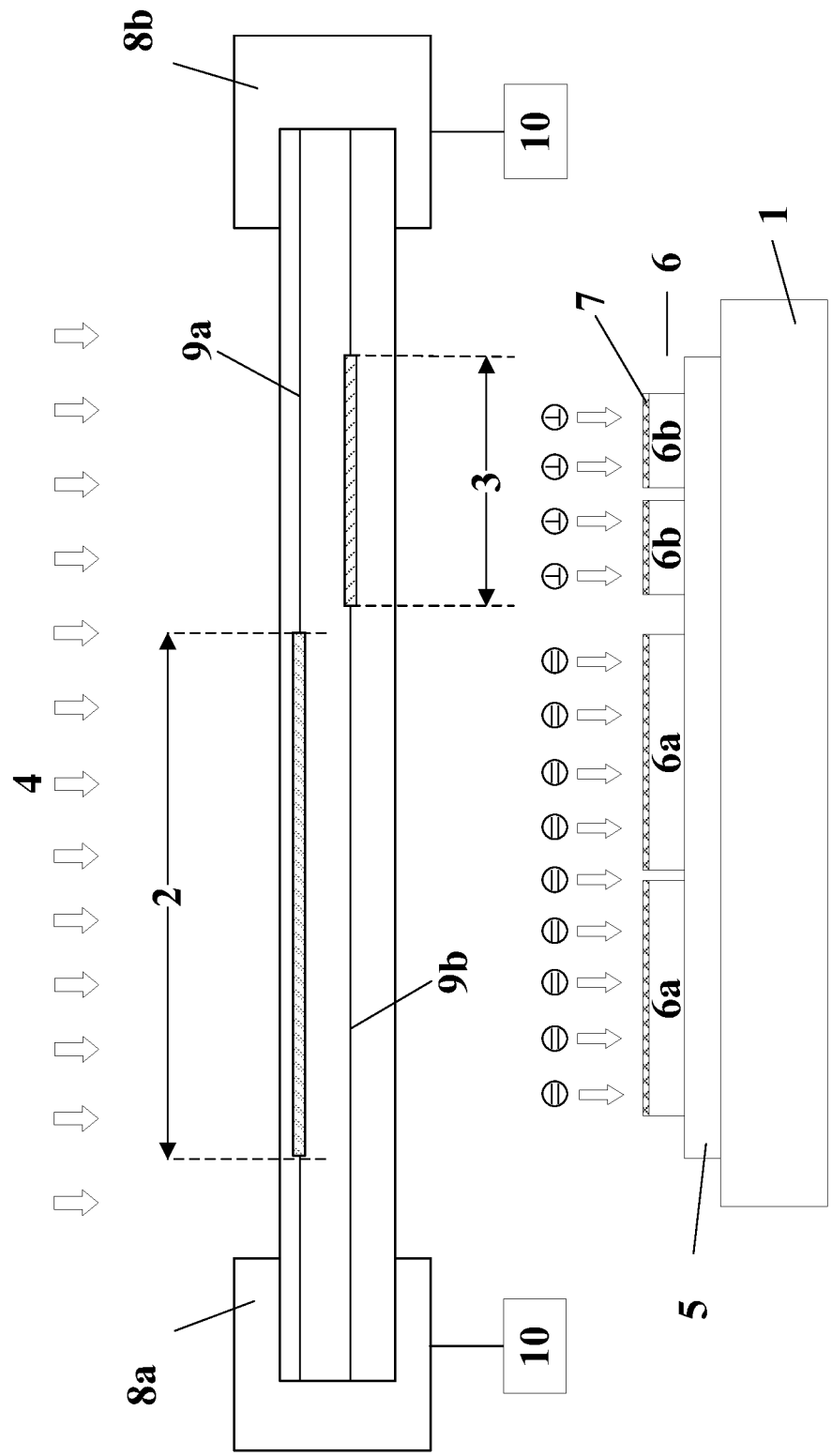
FIG. 3 is a schematic diagram illustrating the structure of an apparatus for fabricating a display substrate of a liquid crystal display panel in some embodiments according to the present disclosure.

FIG. 3 is a schematic diagram illustrating the structure of an apparatus for fabricating a display substrate of a liquid crystal display panel in some embodiments according to the present disclosure. Referring to FIG. 3, the apparatus in some embodiments includes a support 1, a plurality of polarizers including a first polarizer 2 having a first light transmission axis and a second polarizer 3 having a second light transmission axis non-parallel to the first light transmission axis; and a light source 4. The support 1 is configured to receive a mother substrate 5 having a plurality of display substrate units 6 and a photoalignment material layer 7 on the plurality of display substrate units 6. Referring to FIG. 1 and FIG. 3, six of a first display substrate unit 6a and six of a second display substrate unit 6b are fabricated on the mother substrate 5. The light source 4 is configured to irradiate a light on the first display substrate unit 6a of the plurality of display substrate units 6 through the first polarizer 2 and on a second display substrate unit 6b of the plurality of display substrate units 6 through the second polarizer 3.

Figure 4:
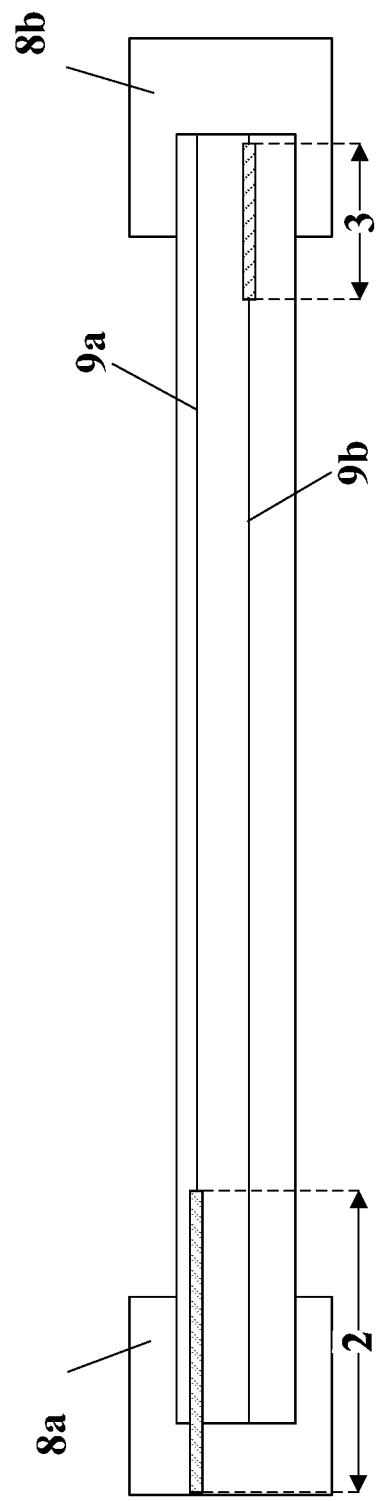
FIG. 4 illustrates a plurality of polarizers at initial positions in an apparatus for fabricating a display substrate of a liquid crystal display panel in some embodiments according to the present disclosure.

In some embodiments, the apparatus further includes a first conveyor 8a configured to move the first polarizer 2 from a first initial position to a first target position, and a second conveyor 8b configured to move the second polarizer 3 from a second initial position to a second target position. FIG. 4 illustrates a plurality of polarizers at initial positions in an apparatus for fabricating a display substrate of a liquid crystal display panel in some embodiments according to the present disclosure. FIG. 3 illustrates a plurality of polarizers respective target positions in the apparatus. At the initial positions, the first polarizer 2 is received into a first container, and the second polarizer 3 is received into a second container. Referring to FIG. 3 and FIG. 4, the apparatus in some embodiments further includes a plurality of conveying guide rails, e.g., a first conveying guide rail 9a for conveying the first polarizer 2 and a second conveying guide rail 9b for conveying the second polarizer 3. The first conveyor 8a is configured to move the first polarizer 2 from a first initial position to a first target position through the first conveying guide rail 9a, and the second conveyor 8b is configured to move the second polarizer 3 from a second initial position to a second target position through the second conveying guide rail 9b.

Figure 5:
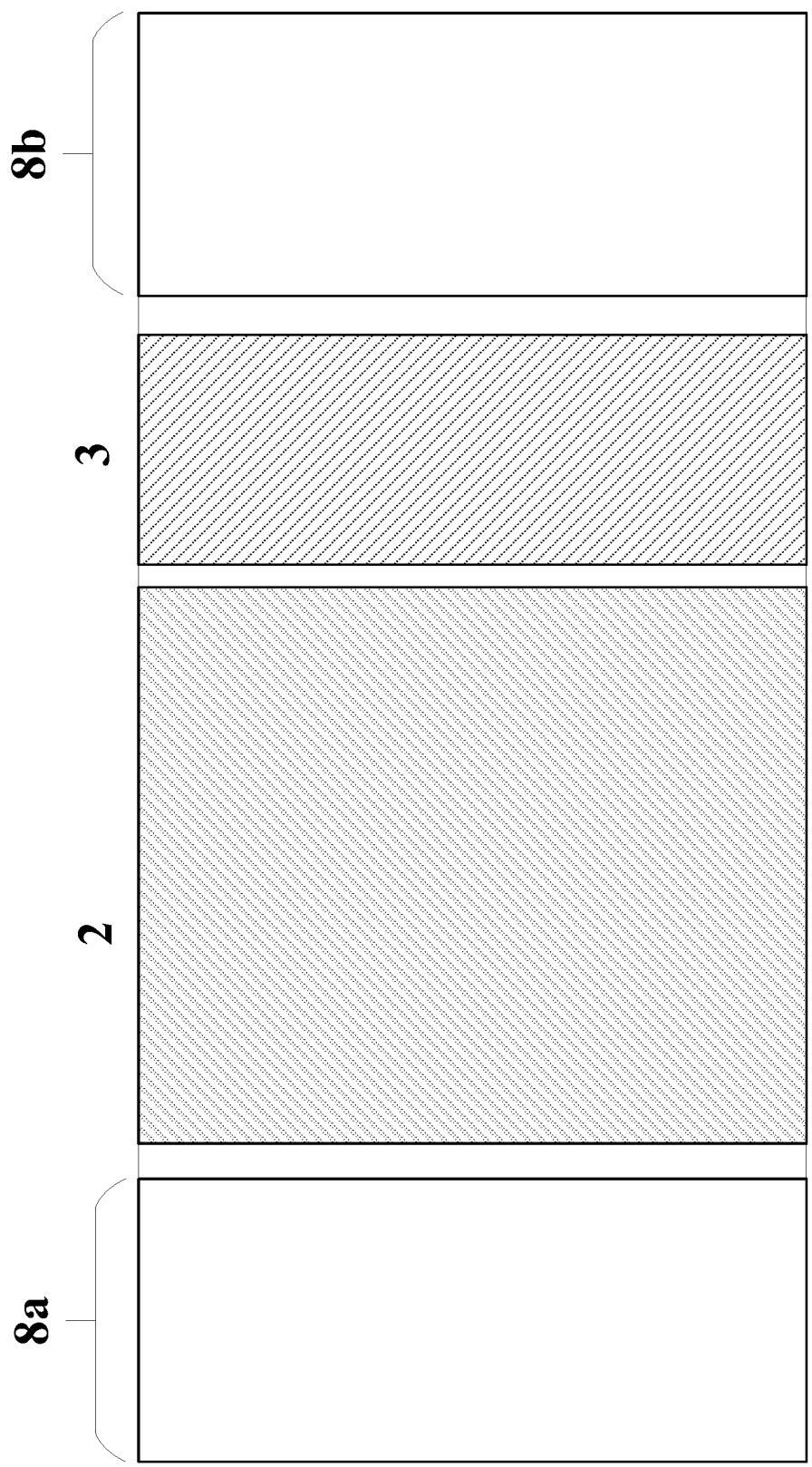
FIG. 5 is a plan view of a plurality of polarizers at target positions in the apparatus of FIG. 3.

FIG. 5 is a plan view of a plurality of polarizers at target positions in the apparatus of FIG. 3. Referring to FIG. 5, the plurality of polarizers include the first polarizer 2 having the first light transmission axis (as indicated by extension direction of the stripe pattern in the first polarizer 2) and the second polarizer 3 having the second light transmission axis (as indicated by extension direction of the stripe pattern in the second polarizer 3). The first light transmission axis and the second light transmission axis are non-parallel to each other (e.g., perpendicular to each other). At target positions, an orthographic projection of the first polarizer 2 at the first target position on the mother substrate 5 substantially covers the first display substrate unit 6a and is substantially outside the second display substrate unit 6b, and an orthographic projection of the second polarizer 3 at the second target position on the mother substrate 5 substantially covers the second display substrate unit 6b and is substantially outside the first display substrate unit 6a. When light (e.g., ultraviolet light) from the light source 4 transmits through the first polarizer 2, a first polarized light having a first polarization direction is generated. The first polarized light irradiates on the first display substrate unit 6a, thereby photo-aligning the photoalignment material layer 7 on the first display substrate unit 6a to achieve a first alignment direction. Similarly, when light from the light source 4 transmits through the second polarizer 3, a second polarized light having a second polarization direction is generated. The second polarized light irradiates on the second display substrate unit 6b, thereby photo-aligning the photoalignment material layer on the second display substrate unit 6b to achieve a second alignment direction non-parallel to the first alignment direction (e.g., perpendicular to the first alignment direction).

Using the present apparatus, the photoalignment material layer 7 on the first display substrate unit 6a and the second display substrate unit 6b can be aligned in a single step, obviating the need of multi-step photoalignment process involving multiple mask plates. By moving a plurality of polarizers respectively to their target positions substantially simultaneously, a plurality of polarized light corresponding to the plurality of polarizers at target positions and the plurality of display substrate units 6 can be generated in a single step process. The present apparatus and method not only achieve excellent cutting efficiency in the MMG process, but also significantly simplify the fabrication process and reduce the tact time and manufacturing costs associated with the MMG process.

Figure 6:
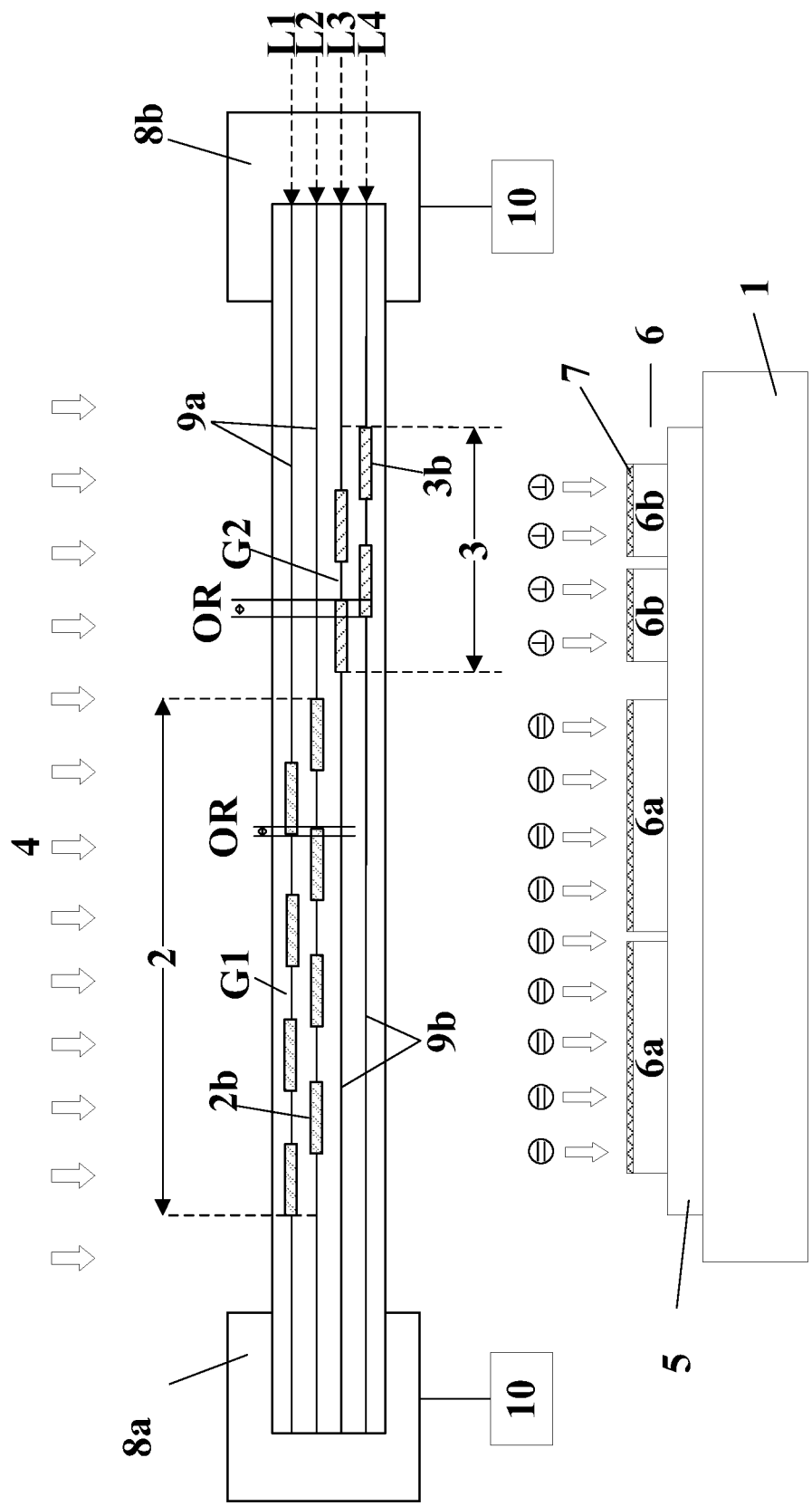
FIG. 6 is a schematic diagram illustrating the structure of an apparatus for fabricating a display substrate of a liquid crystal display panel in some embodiments according to the present disclosure.
Figure 7:
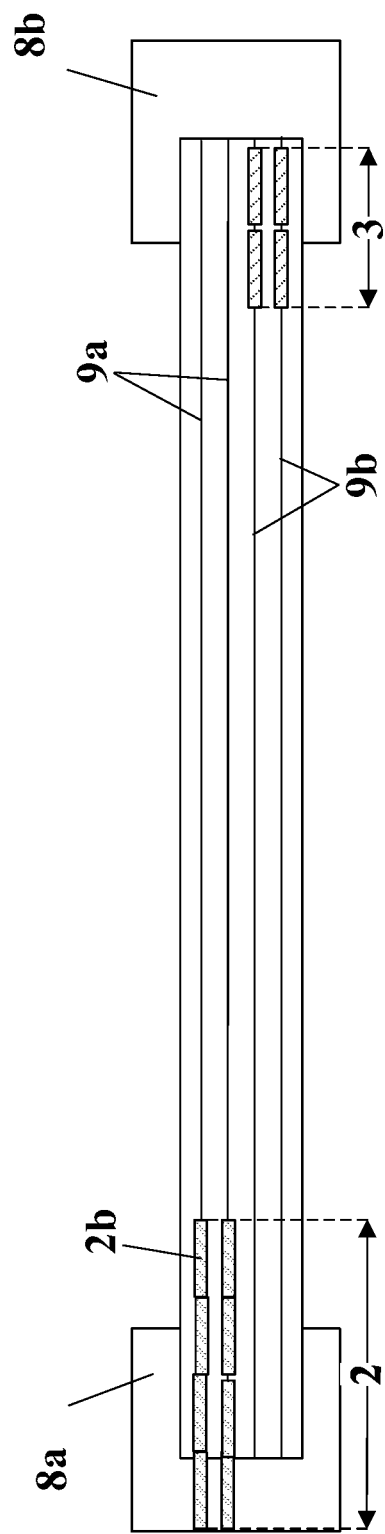
FIG. 7 illustrates a plurality of polarizers at initial positions in an apparatus for fabricating a display substrate of a liquid crystal display panel in some embodiments according to the present disclosure.
Figure 8:
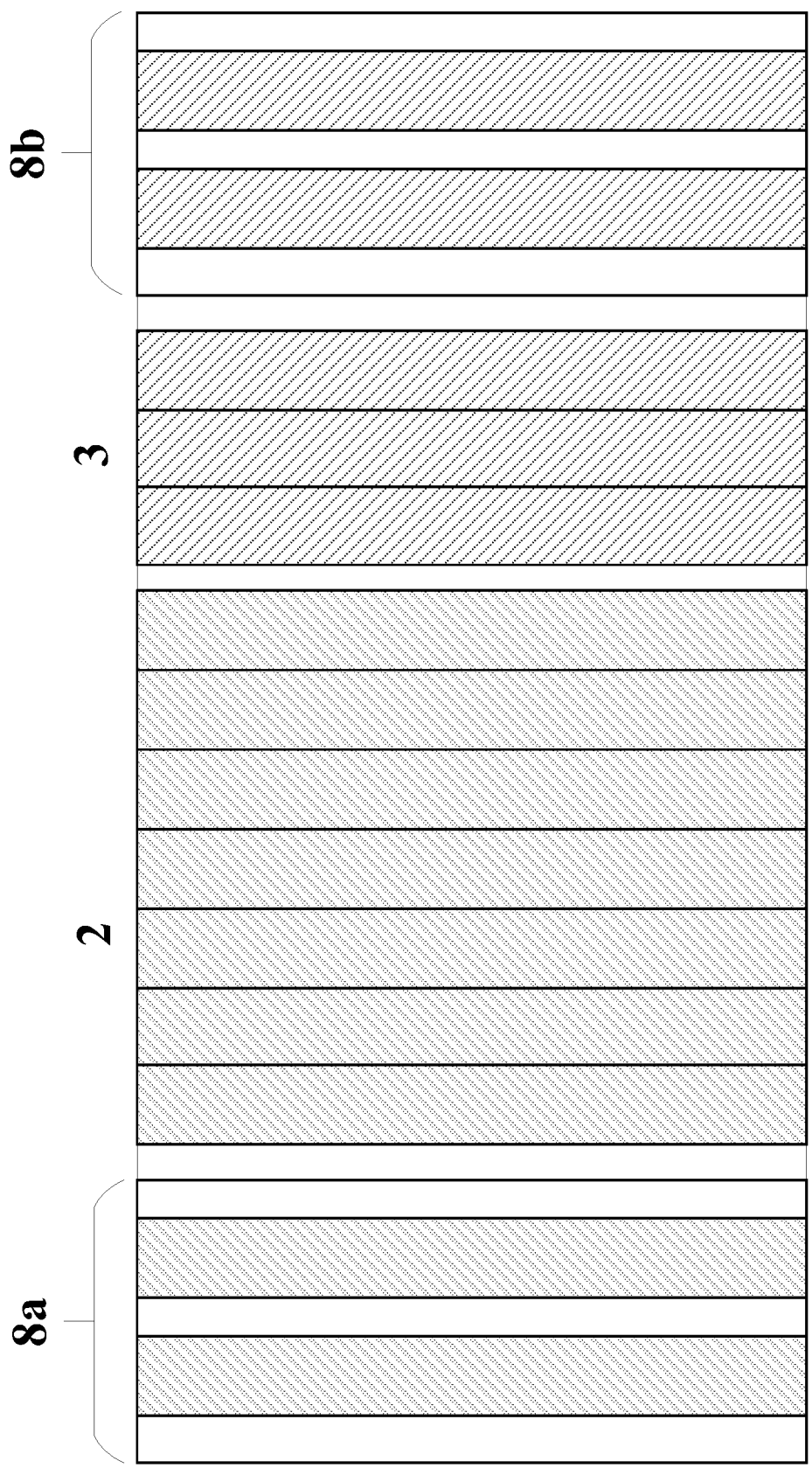
FIG. 8 is a plan view of a plurality of polarizers at target positions in the apparatus of FIG. 6.

FIG. 6 is a schematic diagram illustrating the structure of an apparatus for fabricating a display substrate of a liquid crystal display panel in some embodiments according to the present disclosure. FIG. 7 illustrates a plurality of polarizers at initial positions in an apparatus for fabricating a display substrate of a liquid crystal display panel in some embodiments according to the present disclosure. FIG. 8 is a plan view of a plurality of polarizers at target positions in the apparatus of FIG. 6. In some embodiments, any one of the plurality of polarizers in the apparatus may include a plurality of polarizer blocks. Referring to FIGS. 6 to 8, the first polarizer 2 includes a plurality of first polarizer blocks 2b, and the second polarizer 3 includes a plurality of second polarizer blocks 3b.

In some embodiments, the plurality of first polarizer blocks 2b at the first target position are arranged in a plurality of levels having different heights relative to the support 1. Multiple first polarizer blocks of the plurality of first polarizer blocks 2b in each of the plurality of levels are spaced apart by a plurality of gaps G1. An orthographic projection on the support of each of the plurality of first polarizer blocks 2b at the first target position partially overlaps (e.g., at adjacent portions thereof) with an orthographic projection on the support 1 of one or more of the plurality of first polarizer blocks 2b in different levels of the plurality of levels at the first target position. Optionally, a combined orthographic projection of the plurality of first polarizer blocks 2b in the plurality of levels at the first target position on the support 1 constitutes a continuous projection substantially without a gap (see, e.g., FIG. 8).

For example, the plurality of first polarizer blocks 2b in FIG. 6 are arranged in two levels (a first level L1 and a second level L2) having different heights relative to the support 1. Multiple first polarizer blocks of the plurality of first polarizer blocks 2b in the first level L1 are spaced apart by a plurality of gaps G1, and multiple first polarizer blocks of the plurality of first polarizer blocks 2b in the second level L2 are spaced apart by a plurality of gaps G1. An orthographic projection on the support 1 of any of the plurality of first polarizer blocks 2b in the first level L1 at the first target position partially overlaps (e.g., at adjacent portions thereof) with an orthographic projection on the support 1 of one or two polarizer blocks of the plurality of first polarizer blocks 2b in the second level L2 at the first target position, thereby forming an overlapping region OR. An orthographic projection on the support 1 of any of the plurality of first polarizer blocks 2b in the second level L2 at the first target position partially overlaps (e.g., at adjacent portions thereof) with an orthographic projection on the support 1 of one or two polarizer blocks of the plurality of first polarizer blocks 2b in the first level L1 at the first target position, thereby forming an overlapping region OR. A combined orthographic projection of the plurality of first polarizer blocks 2b in the first level L1 and the second level L2 at the first target position on the support 1 constitutes a continuous projection substantially without a gap (see, e.g., FIG. 8). By having the overlapping region OR, it ensures that light irradiated on each of the plurality of display substrate units is polarized.

In some embodiments, the plurality of second polarizer blocks 3b at the second target position are arranged in a plurality of levels having different heights relative to the support 1. Multiple second polarizer blocks of the plurality of second polarizer blocks 3b in each of the plurality of levels are spaced apart by a plurality of gaps G2. An orthographic projection on the support 1 of each the plurality of second polarizer blocks 3b at the second target position partially overlaps (e.g., at adjacent portions thereof) with an orthographic projection on the support 1 of one or more of the plurality of second polarizer blocks 3b in different levels of the plurality of levels at the second target position. Optionally, a combined orthographic projection of the plurality of second polarizer blocks 3b in the plurality of levels at the second target position on the support 1 constitutes a continuous projection substantially without a gap (see, e.g., FIG. 8).

For example, the plurality of second polarizer blocks 3b in FIG. 6 are arranged in two levels (a third level L3 and a fourth level L4) having different heights relative to the support 1. Multiple second polarizer blocks of the plurality of second polarizer blocks 3b in the third level L3 are spaced apart by a plurality of gaps G2, and multiple second polarizer blocks of the plurality of second polarizer blocks 3b in the fourth level L4 are spaced apart by a plurality of gaps G2. An orthographic projection on the support 1 of any of the plurality of second polarizer blocks 3b iii the third level L3 at the second target position partially overlaps (e.g., at adjacent portions thereof) with an orthographic projection on the support 1 of one or two polarizer blocks of the plurality of second polarizer blocks 3b in the fourth level L4 at the second target position, thereby forming an overlapping region OR. An orthographic projection on the support 1 of any of the plurality of second polarizer blocks 3b in the fourth level L4 at the second target position partially overlaps (e.g., at adjacent portions thereof) with an orthographic projection on the support 1 of one or two polarizer blocks of the plurality of second polarizer blocks 3b in the third level L3 at the second target position, thereby forming an overlapping region OR. A combined orthographic projection of the plurality of second polarizer blocks 3b in the third level L3 and the fourth level L4 at the second target position on the support 1 constitutes a continuous projection substantially without a gap (see, e.g., FIG. 8). By having the overlapping region OR, it ensures that light irradiated on each of the plurality of display substrate units is polarized.

Referring to FIG. 6, in some embodiments, the apparatus further includes a plurality of first conveying guide rails 9a and a plurality of second conveying guide rails 9b. The first conveyor 8a is configured to move the plurality of first polarizer blocks 2b from the first initial position (see FIG. 7) to the first target position (see FIG. 6) through the plurality of first conveying guide rails 9a. The second conveyor 8b is configured to move the plurality of second polarizer blocks 3b from the second initial position (see FIG. 7) to the second target position (see FIG. 6) through the plurality of second conveying guide rails 9b. Each of the plurality of first conveying guide rails 9a and the plurality of second conveying guide rails 9b corresponds to one level of the plurality of levels. For example, the plurality of first polarizer blocks 2b respectively on the plurality of first conveying guide rails 9a are arranged in multiple levels having different heights relative to the support 1, and the plurality of second polarizer blocks 3b respectively on the plurality of second conveying guide rails 9b are arranged in multiple levels having different heights relative to the support 1. Referring to FIG. 6, the apparatus includes two of the plurality of first conveying guide rails 9a and two of the plurality of second conveying guide rails 9b. The two of the plurality of first conveying guide rails 9a correspond to the first level L1 and the second level L2, respectively. The two of the plurality of second conveying guide rails 9b correspond to the third level L3 and the fourth level L4, respectively. The plurality of first polarizer blocks 2b respectively on the plurality of first conveying guide rails 9a are arranged in the first level L1 and the second level L2, The plurality of second polarizer blocks 3b respectively on the plurality of second conveying guide rails 9b are arranged in the third level L3 and the fourth level L4.

Figure 9:
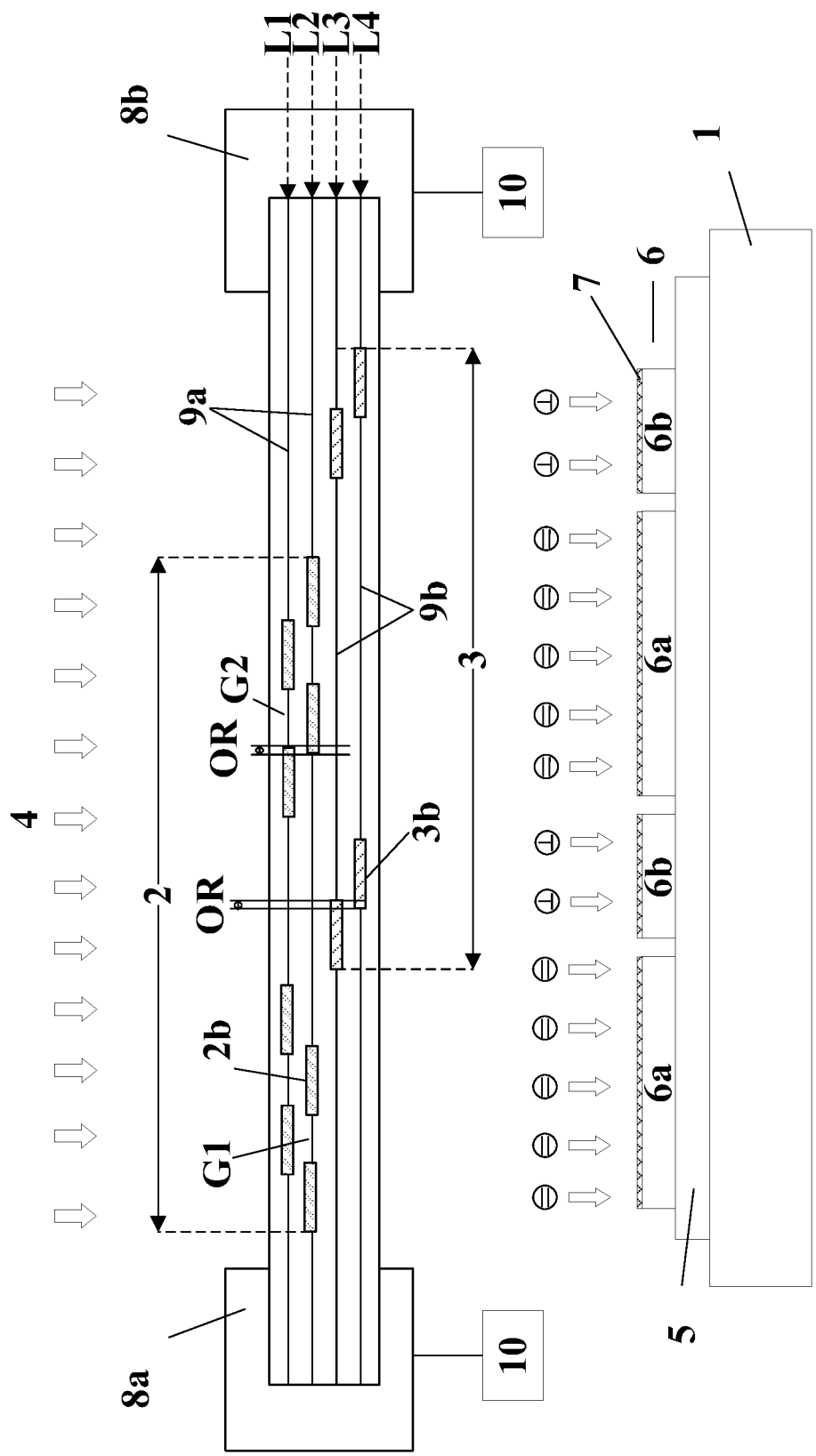
FIG. 9 is a schematic diagram illustrating the structure of an apparatus for fabricating a display substrate of a liquid crystal display panel in some embodiments according to the present disclosure.
Figure 10:
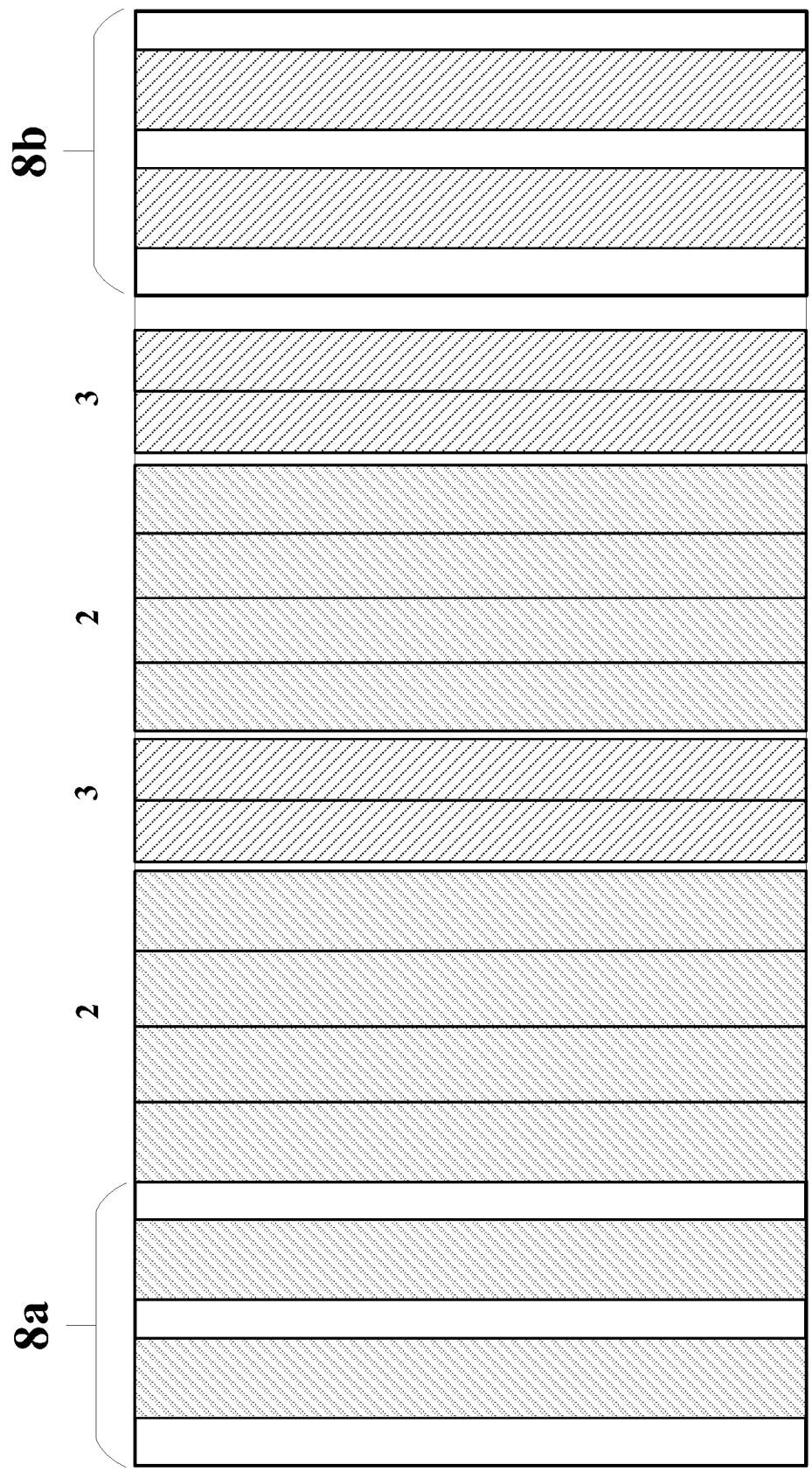
FIG. 10 is a plan view of a plurality of polarizers at target positions in the apparatus of FIG. 9.

FIG. 9 is a schematic diagram illustrating the structure of an apparatus for fabricating a display substrate of a liquid crystal display panel in some embodiments according to the present disclosure. FIG. 10 is a plan view of a plurality of polarizers at target positions in the apparatus of FIG. 9. FIG. 7 illustrates the plurality of polarizers at initial positions. FIG. 9 and FIG. 10 illustrate an apparatus for photo-aligning the photoalignment material layer 7 on the plurality of display substrate units as shown in FIG. 2. As discussed above, the MMG layout of the plurality of display substrate units in FIG. 2 differs from that in FIG. 1 in that columns of the second display substrate unit 6b are spaced apart by columns of first display substrate unit 6a, whereas in FIG. 1 the columns of the second display substrate unit 6b are adjacent to each other and the columns of first display substrate unit 6a are adjacent to each other. The present apparatus has the flexibility to handle photoalignment of various different MMG layouts of the plurality of display substrate units.

Referring to FIG. 9 and FIG. 10, the first polarizer 2 includes a plurality of first polarizer blocks 2b, and the second polarizer 3 includes a plurality of second polarizer blocks 3b. Referring to FIG. 9 and FIG. 2, on the mother substrate 5, the plurality of display substrate units 6 include multiple ones (e.g., eight) of the first display substrate unit 6a and multiple ones (e.g., six) of the second display substrate unit 6b. The eight of the first display substrate unit 6a are arranged in two columns, and the six of the second display substrate unit 6b are arranged in two columns. Columns of the first display substrate unit 6a and columns of the second display substrate unit 6b are arranged alternately. Accordingly, at target positions, the plurality of first polarizer blocks 2b are arranged in columns at two levels (the first level L1 and the second level L2), and the plurality of second polarizer blocks 3b are arranged in columns at two levels (the third level L3 and the fourth level L4). An orthographic projection of the plurality of first polarizer blocks 2b at the first target position on the mother substrate 5 substantially covers the columns of the first display substrate unit 6a. An orthographic projection of the plurality of second polarizer blocks 3b at the second target position on the mother substrate 5 substantially covers the multiple ones of the second display substrate unit 6b. Referring to FIG. 10, orthographic projections of the plurality of first polarizer blocks 2b at the first target position on the mother substrate 5 and orthographic projections of the plurality of second polarizer blocks 3b at the second target position on the mother substrate 5 are arranged alternately.

In some embodiments, and referring to FIG. 9, the apparatus further includes a programmable logic controller 10 configured to control the first conveyor 8a and the second conveyor 8b. Based on the size and layout of the plurality of display substrate units 6 on the mother substrate 5, the programmable logic controller 10 is configured to determine numbers and target positions of the plurality of first polarizer blocks 2b required for photo-aligning the photoalignment material layer 7 on the multiple ones of the first display substrate unit 6a, and determine numbers and target positions of the plurality of second polarizer blocks 3b required for photo-aligning the photoalignment material layer 7 on the multiple ones of the second display substrate unit 6b. Once the numbers and target positions of the plurality of first polarizer blocks 2b and the plurality of second polarizer blocks 3b are determined, the first conveyor 8a and the second conveyor 8b are configured to move the plurality of first polarizer blocks 2b to the first target position and the plurality of second polarizer blocks 3b to the second target position.

By having the programmable logic controller 10, the apparatus can handle photoalignment of various different MMG layouts of the plurality of display substrate units 6. For example, when the apparatus finishes the photoalignment of the plurality of display substrate units 6 as shown in FIG. 9, a mother substrate 5 having a different layout can be loaded on the support 1. The programmable logic controller 10, based on the size and layout of the plurality of display substrate units 6 on the mother substrate 5, is configured to re-calculate numbers and target positions of the plurality of first polarizer blocks 2b required for photo-aligning the photoalignment material layer 7 on the multiple ones of the first display substrate unit 6a, and re-calculate numbers and target positions of the plurality of second polarizer blocks 3b required for photo-aligning the photoalignment material layer 7 on the multiple ones of the second display substrate unit 6b. Subsequently, the first conveyor 8a is configured to move the plurality of first polarizer blocks 2b to a third target position, and the second conveyor 8b is configured to move the plurality of second polarizer blocks 3b to the fourth target position.

Figure 11:
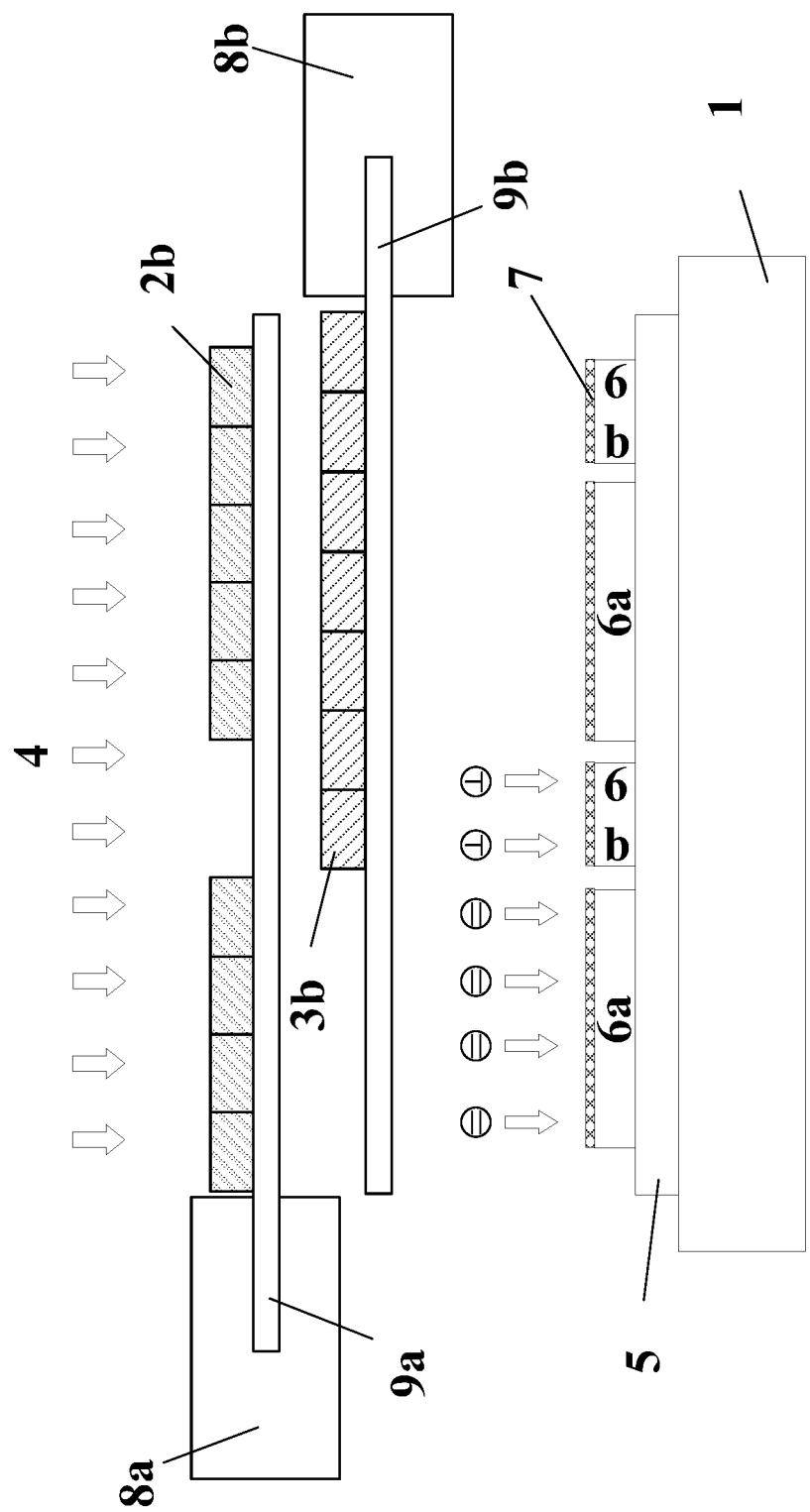
FIG. 11 is a schematic diagram illustrating the structure of an apparatus for fabricating a display substrate of a liquid crystal display panel in some embodiments according to the present disclosure.
Figure 12:
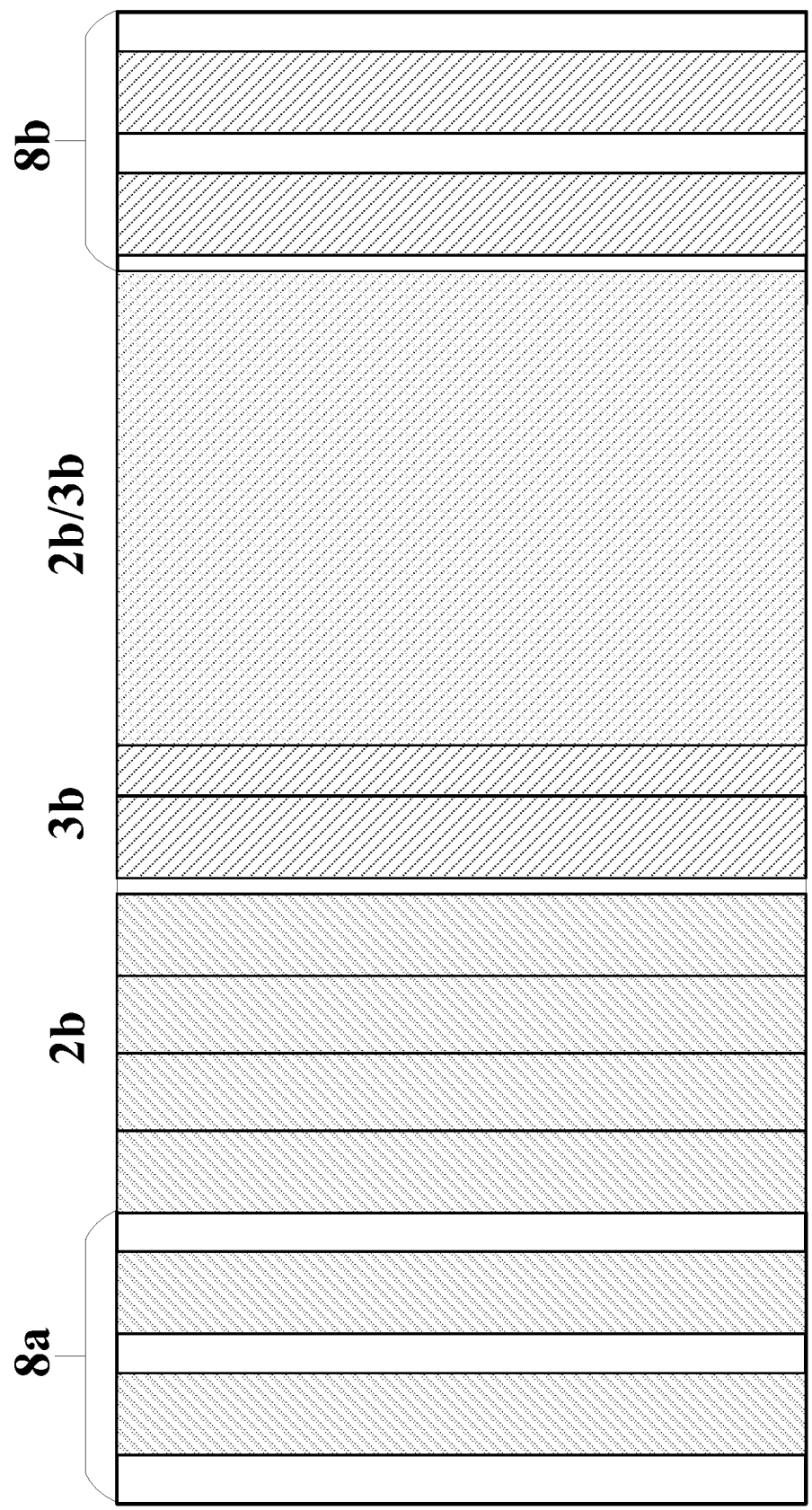
FIG. 12 is a plan view of a plurality of polarizers at target positions in the apparatus of FIG. 11.
Figure 13:
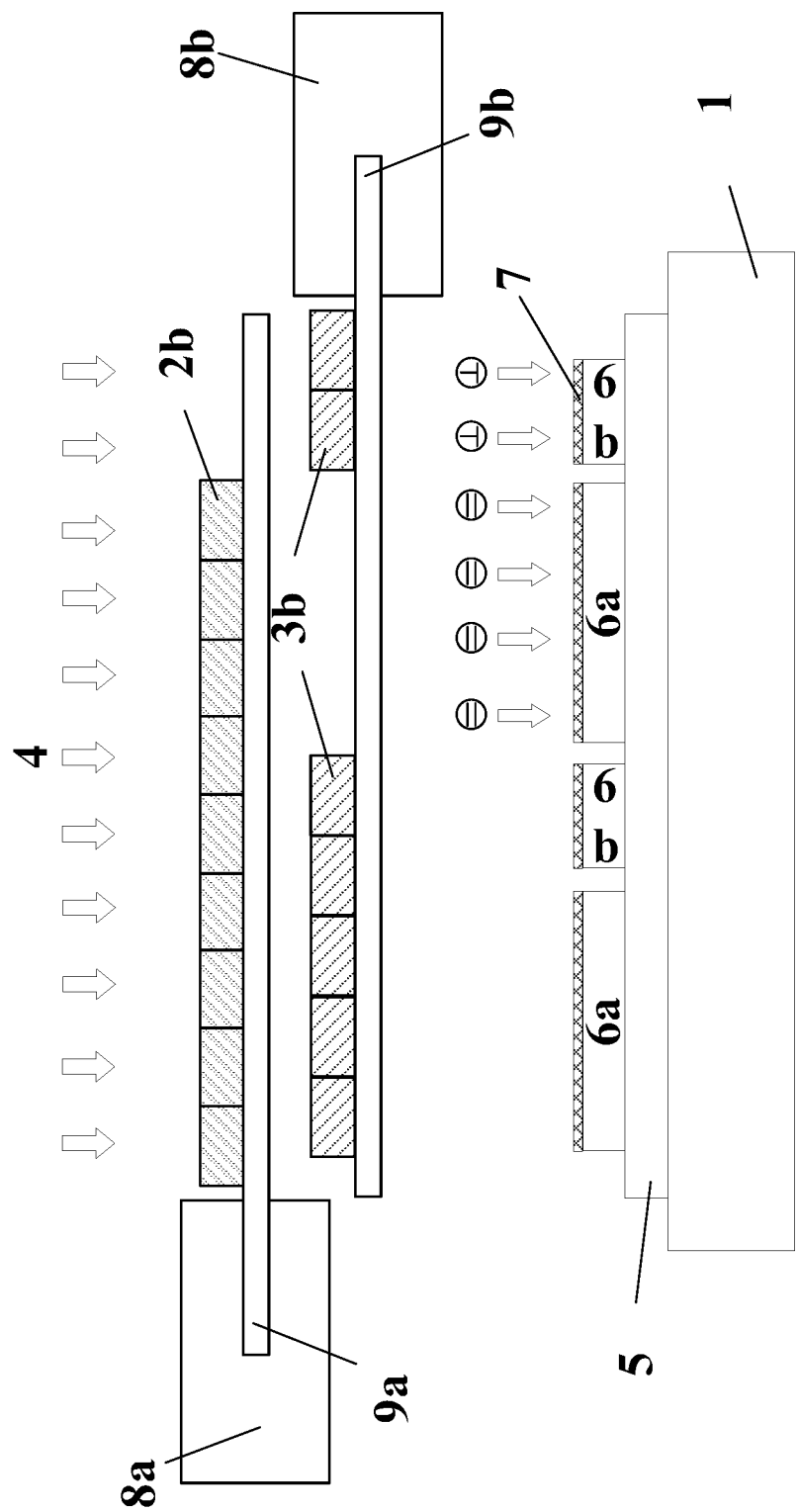
FIG. 13 is a schematic diagram illustrating the structure of an apparatus for fabricating a display substrate of a liquid crystal display panel in some embodiments according to the present disclosure.
Figure 14:
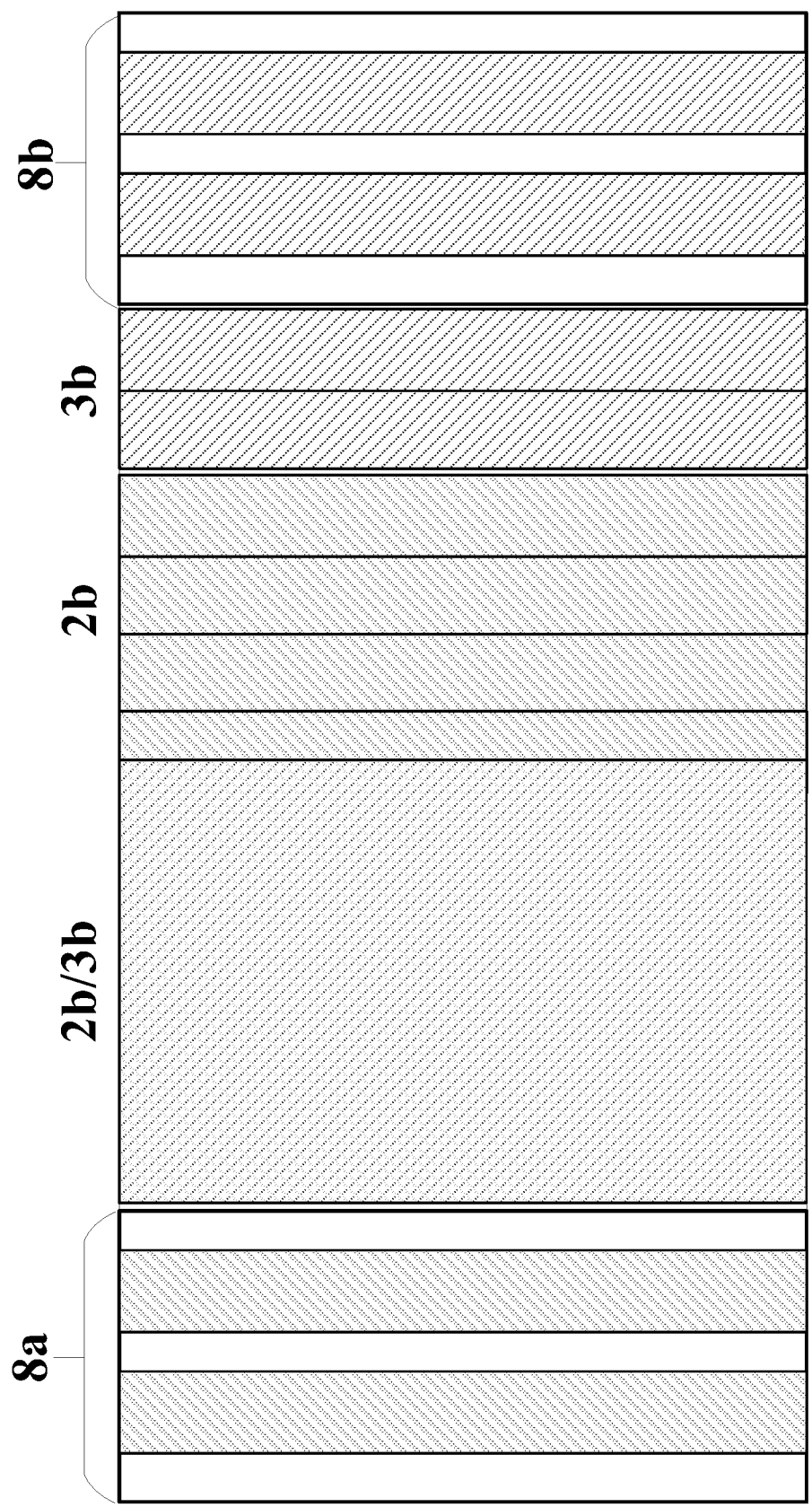
FIG. 14 is a plan view of a plurality of polarizers at target positions in the apparatus of FIG. 13.

In some embodiments, the photoalignment process can be conveniently performed in a two-step process using the plurality of polarizer blocks at respective target positions, further enhancing the flexibility of handling unique layouts of the MMG process. FIGS. 11 to 14 illustrate an example of the two-step process in some embodiments of the present disclosure. FIGS. 11 and 12 illustrate a first step of the process, and FIGS. 13 and 14 illustrate a second step of the process. FIG. 11 is a schematic diagram illustrating the structure of an apparatus for fabricating, a display substrate of a liquid crystal display panel in some embodiments according to the present disclosure. FIG. 12 is a plan view of a plurality of polarizers at target positions in the apparatus of FIG. 11. In the first step, the plurality of first polarizer blocks 2b are moved to a first target position, and the plurality of second polarizer blocks 3b are moved to a second target position. At the first target position, a first batch of the plurality of first polarizer blocks 2b are moved to positions corresponding to a first batch of the plurality of first display substrate units 6a (left side in FIG. 11), an orthographic projection of the first batch of the plurality of first polarizer blocks 2b on the support 1 substantially covers an orthographic projection of the first batch of the plurality of first display substrate units 6a on the support 1, and is substantially non-overlapping with an orthographic projection of any of the plurality of second polarizer blocks 3b on the support 1. When light from the light source 4 irradiates on the first hatch of the plurality of first display substrate units 6a through the first batch of the plurality of first polarizer blocks 2b, the photoalignment material layer 7 on the first batch of the plurality of first display substrate units 6a is photo-aligned. At the first target position, a second batch of the plurality of first polarizer blocks 2b are moved to positions corresponding to a second batch of the plurality of first display substrate units 6a (right side in FIG. 11) and a second batch of the plurality of second display substrate units 6b (right side in FIG. 11). An orthographic projection of the second hatch of the plurality of first polarizer blocks 2b on the support 1 substantially covers an orthographic projection of the second batch of the plurality of first display substrate units 6a and the second batch of the plurality of second display substrate units 6b on the support 1, and substantially overlaps with an orthographic projection of multiple ones of the plurality of second polarizer blocks 3b on the support 1.

Referring to FIG. 11 and FIG. 12 again, at the second target position, a first batch of the plurality of second polarizer blocks 3b are moved to positions corresponding to a first batch of the plurality of second display substrate units 6b (left side in FIG. 11), an orthographic projection of the first batch of the plurality of second polarizer blocks 3b on the support 1 substantially covers an orthographic projection of the first batch of the plurality of second display substrate units 6b on the support 1, and is substantially non-overlapping with an orthographic projection of any of the plurality of first polarizer blocks 2b on the support 1. When light from the light source 4 irradiates on the first batch of the plurality of second display substrate units 6b through the first batch of the plurality of second polarizer blocks 3b, the photoalignment material layer 7 on the first batch of the plurality of second display substrate units 6b is photo-aligned. At the second target position, a second batch of the plurality of second polarizer blocks 3b are moved to positions corresponding to the second batch of the plurality of first display substrate units 6a (right side in FIG. 11) and the second batch of the plurality of second display substrate units 6b (right side in FIG. 11). An orthographic projection of the second batch of the plurality of second polarizer blocks 3b on the support 1 substantially covers an orthographic projection of the second batch of the plurality of first display substrate units 6a and the second batch of the plurality of second display substrate units 6b on the support 1, and substantially overlaps with an orthographic projection of multiple ones of the plurality of first polarizer blocks 2b (right side in FIG. 11 and FIG. 12) on the support 1.

FIGS. 13 and 14 illustrate a second step of the process. FIG. 13 is a schematic diagram illustrating the structure of an apparatus for fabricating a display substrate of a liquid crystal display panel in some embodiments according to the present disclosure. FIG. 14 is a plan view of a plurality of polarizers at target positions in the apparatus of FIG. 13. In the second step, the plurality of first polarizer blocks 2b are moved to a third target position, and the plurality of second polarizer blocks 3b are moved to a fourth target position. At the third target position, a first batch of the plurality of first polarizer blocks 2b are moved to positions corresponding to the second batch of the plurality of first display substrate units 6a (right side in FIG. 13), an orthographic projection of the first batch of the plurality of first polarizer blocks 2b on the support 1 substantially covers an orthographic projection of the second batch of the plurality of first display substrate units 6a on the support 1, and is substantially non-overlapping with an orthographic projection of any of the plurality of second polarizer blocks 3b on the support 1. When light from the light source 4 irradiates on the second batch of the plurality of first display substrate units 6a through the first batch of the plurality of first polarizer blocks 2b, the photoalignment material layer 7 on the second batch of the plurality of first display substrate units 6a is photo-aligned. At the third target position, a second batch of the plurality of first polarizer blocks 2b are moved to positions corresponding to the first batch of the plurality of first display substrate units 6a (left side in FIG. 13) and the first hatch of the plurality of second display substrate units 6b (left side in FIG. 13). An orthographic projection of the second batch of the plurality of first polarizer blocks 2b on the support 1 substantially covers an orthographic projection of the first batch of the plurality of first display substrate units 6a and the first batch of the plurality of second display substrate units 6b on the support 1, and substantially overlaps with an orthographic projection of multiple ones of the plurality of second polarizer blocks 3b (left side of FIG. 13 and FIG. 14) on the support 1.

Referring to FIG. 13 and FIG. 14 again, at the fourth target position, a first batch of the plurality of second polarizer blocks 3b are moved to positions corresponding to the second batch of the plurality of second display substrate units 6b (right side in FIG. 13), an orthographic projection of the first batch of the plurality of second polarizer blocks 3b on the support 1 substantially covers an orthographic projection of the second batch of the plurality of second display substrate units 6b on the support 1, and is substantially non-overlapping with an orthographic projection of any of the plurality of first polarizer blocks 2b. When light from the light source 4 irradiates on the second batch of the plurality of second display substrate units 6b through the first batch of the plurality of second polarizer blocks 3b, the photoalignment material layer 7 on the second batch of the plurality of second display substrate units 6b is photo-aligned. At the fourth target position, a second batch of the plurality of second polarizer blocks 3b are moved to positions corresponding to the first batch of the plurality of first display substrate units 6a (left side in FIG. 13) and the first batch of the plurality of second display substrate units 6b (left side in FIG. 13). An orthographic projection of the second batch of the plurality of second polarizer blocks 3b on the support 1 substantially covers an orthographic projection of the first batch of the plurality of first display substrate units 6a and the first batch of the plurality of second display substrate units 6b on the support 1, and substantially overlaps with an orthographic projection of multiple ones of the plurality of first polarizer blocks 2b on the support 1.

After the first step, the photoalignment material layer 7 on the first hatch of the plurality of first display substrate units 6a and on the first batch of the plurality of second display substrate units 6b is photo-aligned. After the second step, the photoalignment material layer 7 on the second batch of the plurality of first display substrate units 6a and on the second batch of the plurality of second display substrate units 6b is photo-aligned. The apparatus can be adapted to photo-align the photoalignment material layer 7 on more than two batches of the plurality of first display substrate units 6a and more than two batches of the second batch of the plurality of second display substrate units 6b.

In some embodiments, and referring to FIG. 1 and FIG. 2, the plurality of display substrate units 6 include multiple ones of the first display substrate unit 6a and multiple ones of the second display substrate unit 6b. Optionally, the first display substrate unit 6a has a first size; and the second display substrate unit 6b has a second size different from the first size. Optionally, an orthographic projection of the first polarizer 2 at the first target position on the mother substrate 5 substantially covers the multiple ones of the first display substrate unit 6a; and an orthographic projection of the second polarizer 3 at the second target position on the mother substrate 5 substantially covers the multiple ones of the second display substrate unit 6b.

Optionally, the plurality of display substrate units are a plurality of array substrate units. Optionally, the plurality of display substrate units are a plurality of color filter substrate units.

In another aspect, the present disclosure provides a method of fabricating a display substrate of a liquid crystal display panel. In some embodiments, the method includes providing a mother substrate including a plurality of display substrate units and a photoalignment material layer on the plurality of display substrate units on a support; substantially simultaneously disposing a first polarizer having a first light transmission axis and a second polarizer having a second light transmission axis non-parallel to the first light transmission axis on the mother substrate; and photo-aligning the photoalignment material layer by irradiating a light on a first display substrate unit of the plurality of display substrate units through the first polarizer and on a second display substrate unit of the plurality of display substrate units through the second polarizer. Optionally, prior to photo-aligning the photoalignment material layer, the method further includes moving the first polarizer from a first initial position to a first target position; and moving the second polarizer from a second initial position to a second target position. Optionally, the first polarizer is moved to the first target position so that an orthographic projection of the first polarizer at the first target position on the mother substrate substantially covers the first display substrate unit and is substantially outside the second display substrate unit. Optionally, the second polarizer is moved to the second target position so that an orthographic projection of the second polarizer at the second target position on the mother substrate substantially covers the second display substrate unit and is substantially outside the first display substrate unit.

In some embodiments, the first polarizer includes a plurality of first polarizer blocks arranged in multiple levels having different heights relative to the support Optionally, the step of moving the first polarizer to the first target position includes arranging the plurality of first polarizer blocks at the first target position so that multiple first polarizer blocks of the plurality of first polarizer blocks in each level are spaced apart by a plurality of gaps. Optionally, an orthographic projection on the support of each the plurality of first polarizer blocks at the first target position partially overlaps (e.g., at adjacent portions thereof) with an orthographic projection on the support of one or more of the plurality of first polarizer blocks in different levels at the first target position. Optionally, a combined orthographic projection of the plurality of first polarizer blocks in all levels at the first target position on the support constitutes a continuous projection substantially without a gap.

For example, the plurality of first polarizer blocks in some embodiments are arranged in two levels (a first level and a second level) having different heights relative to the support.

Optionally, the first polarizer is moved to the first target position so that multiple first polarizer blocks of the plurality of first polarizer blocks in the first level are spaced apart by a plurality of gaps, and multiple first polarizer blocks of the plurality of first polarizer blocks in the second level are spaced apart by a plurality of gaps. An orthographic projection on the support of any of the plurality of first polarizer blocks in the first level at the first target position partially overlaps (e.g., at adjacent portions thereof) with an orthographic projection on the support of one or two polarizer blocks of the plurality of first polarizer blocks in the second level at the first target position, thereby forming an overlapping region. An orthographic projection on the support of any of the plurality of first polarizer blocks in the second level at the first target position partially overlaps (e.g., at adjacent portions thereof) with an orthographic projection on the support of one or two polarizer blocks of the plurality of first polarizer blocks in the first level at the first target position, thereby forming an overlapping region. Optionally, the first polarizer is moved to the first target position so that a combined orthographic projection of the plurality of first polarizer blocks in the first level and the second level at the first target position on the support constitutes a continuous projection substantially without a gap.

In some embodiments, the second polarizer includes a plurality of second polarizer blocks arranged in multiple levels having different heights relative to the support. Optionally, the step of moving the second polarizer to the second target position includes arranging the plurality of second polarizer blocks at the second target position so that multiple second polarizer blocks of the plurality of second polarizer blocks in each level are spaced apart by a plurality of gaps. Optionally, an orthographic projection on the support of each the plurality of second polarizer blocks at the second target position partially overlaps (e.g., at adjacent portions thereof) with an orthographic projection on the support of one or more of the plurality of second polarizer blocks in different levels at the second target position. Optionally, a combined orthographic projection of the plurality of second polarizer blocks in all levels at the second target position on the support constitutes a continuous projection substantially without a gap.

For example, the plurality of second polarizer blocks in some embodiments are arranged in two levels (a third level and a fourth level) having different heights relative to the support. Optionally, the second polarizer is moved to the second target position so that multiple second polarizer blocks of the plurality of second polarizer blocks in the third level are spaced apart by a plurality of gaps, and multiple second polarizer blocks of the plurality of second polarizer blocks in the fourth level are spaced apart by a plurality of gaps. Optionally, the second polarizer is moved to the second target position so that an orthographic projection on the support of any of the plurality of second polarizer blocks in the third level at the second target position partially overlaps (e.g., at adjacent portions thereof) with an orthographic projection on the support of one or two polarizer blocks of the plurality of second polarizer blocks in the fourth level at the first target position, thereby forming an overlapping region. Optionally, the second polarizer is moved to the second target position so that an orthographic projection on the support of any of the plurality of second polarizer blocks in the fourth level at the second target position partially overlaps (e.g., at adjacent portions thereof) with an orthographic projection on the support of one or two polarizer blocks of the plurality of second polarizer blocks in the third level at the first target position, thereby forming an overlapping region. Optionally, the second polarizer is moved to the second target position so that a combined orthographic projection of the plurality of second polarizer blocks in the third level and the fourth level at the second target position on the support constitutes a continuous projection substantially without a gap.

In some embodiments, the method further includes moving the first polarizer to a third target position; and moving the second polarizer to a fourth target position. In some embodiments, the step of photo-aligning the photoalignment material layer on the first display substrate unit and on a second display substrate unit are performed in a two-step process. In the first step, the plurality of first polarizer blocks are moved to a first target position, and the plurality of second polarizer blocks are moved to a second target position. In the second step, the plurality of first polarizer blocks are moved to a third target position, and the plurality of second polarizer blocks are moved to a fourth target position.

In some embodiments, in the first step, the plurality of first polarizer blocks are moved to the first target position so that a first batch of the plurality of first polarizer blocks are moved to positions corresponding to a first batch of the plurality of first display substrate units. Optionally, when the plurality of first polarizer blocks are moved to a first target position, an orthographic projection of the first batch of the plurality of first polarizer blocks on the support substantially covers an orthographic projection of the first batch of the plurality of first display substrate units on the support, and is substantially non-overlapping with an orthographic projection of any of the plurality of second polarizer blocks on the support. Optionally, the step of photo-aligning the photoalignment material layer includes irradiating light from the light source on the first batch of the plurality of first display substrate units through the first batch of the plurality of first polarizer blocks, thereby photo-aligning the photoalignment material layer on the first batch of the plurality of first display substrate units. Further, in the first step, the plurality of first polarizer blocks are moved to the first target position so that a second batch of the plurality of first polarizer blocks are moved to positions corresponding to a second batch of the plurality of first display substrate units and a second batch of the plurality of second display substrate units. Optionally, when the plurality of first polarizer blocks are moved to the first target position, an orthographic projection of the second batch of the plurality of first polarizer blocks on the support substantially covers an orthographic projection of the second batch of the plurality of first display substrate units and the second batch of the plurality of second display substrate units on the support, and substantially overlaps with an orthographic projection of multiple ones of the plurality of second polarizer blocks on the support.

In some embodiments, in the first step, the plurality of second polarizer blocks are moved to the second target position so that a first batch of the plurality of second polarizer blocks are moved to positions corresponding to a first batch of the plurality of second display substrate units. Optionally, when the plurality of second polarizer blocks are moved to the second target position, an orthographic projection of the first batch of the plurality of second polarizer blocks on the support substantially covers an orthographic projection of the first batch of the plurality of second display substrate units on the support, and is substantially non-overlapping with an orthographic projection of any of the plurality of first polarizer blocks on the support. Optionally, the step of photo-aligning the photoalignment material layer includes irradiating light from the light source on the first batch of the plurality of second display substrate units through the first batch of the plurality of second polarizer blocks, thereby photo-aligning the photoalignment material layer on the first batch of the plurality of second display substrate units. Further, in the first step, the plurality of second polarizer blocks are moved to the second target position so that a second batch of the plurality of second polarizer blocks are moved to positions corresponding to the second batch of the plurality of first display substrate units and the second batch of the plurality of second display substrate units. Optionally, when the plurality of second polarizer blocks are moved to the second target position, an orthographic projection of the second batch of the plurality of second polarizer blocks on the support substantially covers an orthographic projection of the second batch of the plurality of first display substrate units and the second batch of the plurality of second display substrate units on the support, and substantially overlaps with an orthographic projection of multiple ones of the plurality of first polarizer blocks on the support.

In some embodiments, in the second step, the plurality of first polarizer blocks are moved to the third target position so that a first batch of the plurality of first polarizer blocks are moved to positions corresponding to the second batch of the plurality of first display substrate units. Optionally, when the plurality of first polarizer blocks are moved to the third target position, an orthographic projection of the first batch of the plurality of first polarizer blocks on the support substantially covers an orthographic projection of the second batch of the plurality of first display substrate units on the support, and is substantially non-overlapping with an orthographic projection of any of the plurality of second polarizer blocks on the support. Optionally, the step of photo-aligning the photoalignment material layer includes irradiating light from the light source on the second batch of the plurality of first display substrate units through the first batch of the plurality of first polarizer blocks, thereby photo-aligning the photoalignment material layer on the second batch of the plurality of first display substrate units. Further, in the second step, the plurality of first polarizer blocks are moved to the third target position so that a second batch of the plurality of first polarizer blocks are moved to positions corresponding to the first batch of the plurality of first display substrate units and the first batch of the plurality of second display substrate units. Optionally, when the plurality of first polarizer blocks are moved to third target position, an orthographic projection of the second batch of the plurality of first polarizer blocks on the support substantially covers an orthographic projection of the first batch of the plurality of first display substrate units 6a and the first batch of the plurality of second display substrate units on the support, and substantially overlaps with an orthographic projection of multiple ones of the plurality of second polarizer blocks on the support.

In some embodiments, in the second step, the plurality of second polarizer blocks are moved to the fourth target position so that a first batch of the plurality of second polarizer blocks are moved to positions corresponding to the second batch of the plurality of second display substrate units. Optionally, when the plurality of second polarizer blocks are moved to the fourth target position, an orthographic projection of the first batch of the plurality of second polarizer blocks on the support substantially covers an orthographic projection of the second batch of the plurality of second display substrate units on the support, and is substantially non-overlapping with an orthographic projection of any of the plurality of first polarizer blocks on the support. Optionally, the step of photo-aligning the photoalignment material layer includes irradiating light from the light source on the second batch of the plurality of second display substrate units through the first batch of the plurality of second polarizer blocks, thereby photo-aligning the photoalignment material layer on the second batch of the plurality of second display substrate units. Further, in the second step, the plurality of second polarizer blocks are moved to the fourth target position so that a second batch of the plurality of second polarizer blocks are moved to positions corresponding to the first batch of the plurality of first display substrate units and the first batch of the plurality of second display substrate units. Optionally, when the plurality of second polarizer blocks are moved to the fourth target position, an orthographic projection of the second batch of the plurality of second polarizer blocks on the support substantially covers an orthographic projection of the first batch of the plurality of first display substrate units and the first batch of the plurality of second display substrate units on the support, and substantially overlaps with an orthographic projection of multiple ones of the plurality of first polarizer blocks on the support.

After the first step, the photoalignment material layer on the first batch of the plurality of first display substrate units and on the first batch of the plurality of second display substrate units is photo-aligned. After the second step, the photoalignment material layer on the second batch of the plurality of first display substrate units and on the second batch of the plurality of second display substrate units is photo-aligned. The method can be adapted to photo-align the photoalignment material layer on more than two batches of the plurality of first display substrate units and more than two batches of the second batch of the plurality of second display substrate units.

In some embodiments, the plurality of display substrate units include multiple ones of the first display substrate unit and multiple ones of the second display substrate unit. Optionally, the first display substrate unit has a first size, and the second display substrate unit has a second size different from the first size. Optionally, the first polarizer (e.g., the plurality of first polarizer blocks) is moved to the first target position so that an orthographic projection of the first polarizer at the first target position on the mother substrate substantially covers the multiple ones of the first display substrate unit. Optionally, the second polarizer (e.g., the plurality of second polarizer blocks) is moved to the second target position so that an orthographic projection of the second polarizer at the second target position on the mother substrate substantially covers the multiple ones of the second display substrate unit.

Optionally, the first polarizer includes a plurality of first polarizer blocks arranged in multiple levels having different heights relative to the support. Optionally, the second polarizer includes a plurality of second polarizer blocks arranged in multiple levels having different heights relative to the support.

Optionally, the method further includes determining numbers and target positions of the plurality of first polarizer blocks for photo-aligning the photoalignment material layer on the multiple ones of the first display substrate unit. Optionally, the method further includes determining numbers and target positions of the plurality of second polarizer blocks for photo-aligning the photoalignment material layer on the multiple ones of the second display substrate unit.

Optionally, the plurality of display substrate units are a plurality of array substrate units. Optionally, the plurality of display substrate units are a plurality of color filter substrate units.

In another aspect, the present disclosure provides a display apparatus including a display substrate fabricated by the method described herein. Examples of appropriate display apparatuses include, but are not limited to, an electronic paper, a mobile phone, a tablet computer, a television, a monitor, a notebook computer, a digital album, a GPS, etc. In one example, the display apparatus is a smart watch. Optionally, the display apparatus is an organic light emitting diode display apparatus.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus for fabricating a display substrate of a liquid crystal display panel, comprising:
   a support for receiving a mother substrate comprising a plurality of display substrate units and a photoalignment material layer on the plurality of display substrate units;
   a plurality of polarizers comprising a first polarizer having a first light transmission axis, and a second polarizer having a second light transmission axis non-parallel to the first light transmission axis;
   a light source for irradiating a light on a first display substrate unit of the plurality of display substrate units through the first polarizer and on a second display substrate unit of the plurality of display substrate units through the second polarizer;
   a first conveyor configured to move the first polarizer from a first initial position to a first target position; and
   a second conveyor configured to move the second polarizer from a second initial position to a second target position;
   wherein an orthographic projection of the first polarizer at the first target position on the mother substrate substantially covers the first display substrate unit and is substantially outside the second display substrate unit; and
   an orthographic projection of the second polarizer at the second target position on the mother substrate substantially covers the second display substrate unit and is substantially outside the first display substrate unit.

2. The apparatus of claim 1, wherein the first polarizer comprises a plurality of first polarizer blocks; and
   the second polarizer comprises a plurality of second polarizer blocks.

3. The apparatus of claim 2, wherein the plurality of first polarizer blocks at the first target position are in a plurality of levels having different heights relative to the support;
   multiple first polarizer blocks of the plurality of first polarizer blocks in each of the plurality of levels are spaced apart by a plurality of gaps;
   a first one of the plurality of first polarizer blocks at the first target position has a first orthographic projection on the support;
   the first orthographic projection partially overlaps with an orthographic projection on the support of one or more of the plurality of first polarizer blocks in different levels of the plurality of levels at the first target position; and
   a combined orthographic projection of the plurality of first polarizer blocks in the plurality of levels at the first target position on the support constitutes a continuous projection substantially without a gap.

4. The apparatus of claim 2, wherein the plurality of second polarizer blocks at the second target position are in a plurality of levels having different heights relative to the support;
   multiple second polarizer blocks of the plurality of second polarizer blocks in each of the plurality of levels are spaced apart by a plurality of gaps;
   a first one the plurality of second polarizer blocks at the second target position has a second orthographic projection on the support;
   the second orthographic projection partially overlaps with an orthographic projection on the support of one or more of the plurality of second polarizer blocks in different levels of the plurality of levels at the second target position; and
   a combined orthographic projection of the plurality of second polarizer blocks in the plurality of levels at the second target position on the support constitutes a continuous projection substantially without a gap.

5. The apparatus of claim 2, further comprising a plurality of first conveying guide rails and a plurality of second conveying guide rails;
   the first conveyor is configured to move the plurality of first polarizer blocks from the first initial position to the first target position through the plurality of first conveying guide rails; and
   the second conveyor is configured to move the plurality of second polarizer blocks from the second initial position to the second target position through the plurality of second conveying guide rails.

6. The apparatus of claim 5, wherein the plurality of first polarizer blocks respectively on the plurality of first conveying guide rails are in multiple levels having different heights relative to the support; and the plurality of second polarizer blocks respectively on the plurality of second conveying guide rails are in multiple levels having different heights relative to the support.

7. The apparatus of claim 1, wherein the plurality of display substrate units comprising multiple ones of the first display substrate unit and multiple ones of the second display substrate unit;

the first display substrate unit has a first size;

the second display substrate unit has a second size different from the first size;

an orthographic projection of the first polarizer at the first target position on the mother substrate substantially covers the multiple ones of the first display substrate unit; and an orthographic projection of the second polarizer at the second target position on the mother substrate substantially covers the multiple ones of the second display substrate unit.

8. The apparatus of claim 1, further comprising a programmable logic controller configured to control the first conveyor and the second conveyor.

9. The apparatus of claim 1, wherein the plurality of display substrate units are a plurality of array substrate units.

10. The apparatus of claim 1, wherein the plurality of display substrate units are a plurality of color filter substrate units.

11. A method of fabricating a display substrate of a liquid crystal display panel, comprising:

providing a mother substrate comprising a plurality of display substrate units and a photoalignment material layer on the plurality of display substrate units on a support;

substantially simultaneously disposing a first polarizer having a first light transmission axis and a second polarizer having a second light transmission axis non-parallel to the first light transmission axis on the mother substrate;

photo-aligning the photoalignment material layer by irradiating a light on a first display substrate unit of the plurality of display substrate units through the first polarizer and on a second display substrate unit of the plurality of display substrate units through the second polarizer; and prior to photo-aligning the photoalignment material layer, moving the first polarizer from a first initial position to a first target position, and moving the second polarizer from a second initial position to a second target position;

wherein an orthographic projection of the first polarizer at the first target position on the mother substrate substantially covers the first display substrate unit and is substantially outside the second display substrate unit; and an orthographic projection of the second polarizer at the second target position on the mother substrate substantially covers the second display substrate unit and is substantially outside the first display substrate unit.

12. The method of claim 11, wherein the first polarizer comprises a plurality of first polarizer blocks in multiple levels having different heights relative to the support;

wherein moving the first polarizer to the first target position comprises arranging the plurality of first polarizer blocks at the first target position so that multiple first polarizer blocks of the plurality of first polarizer blocks in each level are spaced apart by a plurality of gaps, a first one of the plurality of first polarizer blocks at the first target position has a first orthographic projection on the support, the first orthographic projection partially overlaps with an orthographic projection on the support of one or more of the plurality of first polarizer blocks in different levels at the first target position, and a combined orthographic projection of the plurality of first polarizer blocks in all levels at the first target position on the support constitutes a continuous projection substantially without a gap.

13. The method of claim 11, wherein the second polarizer comprises a plurality of second polarizer blocks in multiple levels having different heights relative to the support;

wherein moving the second polarizer to the second target position comprises arranging the plurality of second polarizer blocks at the second target position so that multiple second polarizer blocks of the plurality of second polarizer blocks in each level are spaced apart by a plurality of gaps, a first one of the plurality of second polarizer blocks at the second target position has a second orthographic projection on the support, the second orthographic projection partially overlaps with an orthographic projection on the support of one or more of the plurality of second polarizer blocks in different levels at the second target position, and a combined orthographic projection of the plurality of second polarizer blocks in all levels at the second target position on the support constitutes a continuous projection substantially without a gap.

14. The method of claim 11, wherein the plurality of display substrate units comprising multiple ones of the first display substrate unit and multiple ones of the second display substrate unit;

the first display substrate unit has a first size;

the second display substrate unit has a second size different from the first size;

an orthographic projection of the first polarizer at the first target position on the mother substrate substantially covers the multiple ones of the first display substrate unit; and an orthographic projection of the second polarizer at the second target position on the mother substrate substantially covers the multiple ones of the second display substrate unit.

15. The method of claim 14, wherein the first polarizer comprises a plurality of first polarizer blocks in multiple levels having different heights relative to the support; and the second polarizer comprises a plurality of second polarizer blocks in multiple levels having different heights relative to the support;

wherein the method further comprises:

determining numbers and target positions of the plurality of first polarizer blocks for photo-aligning the photoalignment material layer on the multiple ones of the first display substrate unit and numbers and target positions of the plurality of second polarizer blocks for photo-aligning the photoalignment material layer on the multiple ones of the second display substrate unit.

16. A display apparatus, comprising a display substrate fabricated by the method of claim 11.

* * * * *